(12) United States Patent
Mednikov et al.

(10) Patent No.: US 6,191,575 B1
(45) Date of Patent: Feb. 20, 2001

(54) DEVICE FOR MEASURING LINEAR DISPLACEMENTS

(75) Inventors: Felix Mednikov; Mark Nechaevsky, both of Samara (RU)

(73) Assignee: Micro-Epsion messtechnic GmbH & Co. KG (DE)

( * ) Notice: Under 35 U.S.C. 154(b), the term of this patent shall be extended for 0 days.

(21) Appl. No.: 09/123,051

(22) Filed: Jul. 27, 1998

(30) Foreign Application Priority Data

Jul. 24, 1997 (RU) .................................................. 97112278

(51) Int. Cl.$^7$ ....................................................... G01B 7/14
(52) U.S. Cl. ................ 324/207.16; 324/207.24; 336/45
(58) Field of Search .................. 324/207.16, 207.12, 324/207.19, 207.24; 336/45, 75; 340/870.32, 870.33

(56) References Cited

U.S. PATENT DOCUMENTS

| 4,723,446 | * | 2/1988 | Saito et al. .............................. 73/313 |
| 4,954,776 | | 9/1990 | Husher ............................ 324/207.16 |
| 5,010,298 | | 4/1991 | Uemura ........................... 324/207.19 |
| 5,210,490 | | 5/1993 | Munch et al. .................... 324/207.17 |
| 5,216,364 | | 6/1993 | Ko et al. .......................... 324/207.24 |
| 5,331,277 | | 7/1994 | Burreson ......................... 324/207.16 |
| 5,736,854 | * | 4/1998 | Ziiger .............................. 324/207.12 |
| 5,854,553 | * | 12/1998 | Barclay et al. .................. 324/207.16 |

OTHER PUBLICATIONS

D.I. Ageikin et al., "Control and Regulation Transducers", 1965 (with English translation).

* cited by examiner

Primary Examiner—Christine Oda
Assistant Examiner—Anthony Jolly
(74) Attorney, Agent, or Firm—Ostrolenk, Faber, Gerb & Soffen, LLP

(57) ABSTRACT

The proposed device comprises a primary detector and a measuring amplifier, the primary converter comprising a central cylindrical core and an external cylindrical core arranged coaxially along a longitudinal axis, a movable member being mounted coaxially with the cores, a measuring winding arranged on the central core along the longitudinal axis in such a manner that the turns of the winding encompass the central core in a transverse direction, and an additional winding having a common electrical connection point with the measuring winding and disposed on one of the cores so that its turns encompass the core in a longitudinal direction and pass through the corresponding central axial opening. The measuring winding and the additional winding are connected with the measuring amplifier, and alternating current voltage is fed to the input thereof.

15 Claims, 2 Drawing Sheets

DEVICE FOR MEASURING LINEAR DISPLACEMENTS

The present invention relates to measuring technique and more particularly to a device for measuring linear displacements.

FIELD OF APPLICATION

The present invention can be used in mechanical engineering for testing structures, controlling technological processes, as well as in other fields.

BACKGROUND OF THE INVENTION

A large number of designs of inductive and transformer-type linear displacement devices (transducers) are known in the present state of the art, that are widely used in different instruments and measuring information systems.

Most of the known linear displacement transducers are characterized by the presence of an error in the results of measurements, so-called additional error, caused by external factors. Many of the improvements in the designs of the known transducers are directed to increasing the accuracy of measurements by minimizing the additional error; nevertheless, this problem still remains urgent.

Known in the art is a device for measuring displacements, belonging to the category of transformer-type transducers (U.S. Pat. No. 5,010,298), which comprises a variable-inductance winding consisting of two coils arranged on a core made from a ferromagnetic material. The coils abut each other in an axial direction and are encompassed by a metallic screen, and the primary detector circuit is connected with the winding.

The overall dimensions of the known transducer are sufficiently large, because its length is approximately twice the displacement range, this being of crucial importance when the measuring ranges are large. Due to the large overall dimensions of the transducer its parts are under different conditions, and this leads to the appearance of an additional error caused by temperature and moisture gradients and other external factors.

Transducers for measuring linear displacements are also known, described in U.S. Pat. Nos. 5,210,490 and 5,216,364). Each of these transducers has two coaxial cores on which transformer windings are arranged. In the first version the primary and secondary transformer windings abut each other, and a movable member moves along them; in the second version the windings are arranged on the corresponding cores and the movable member moves in a gap between the cores. An electric circuit whose output signal bears information on the displacement of an object is connected to the windings.

The output voltage for these devices is found from the formula $$U_{out} = j\omega M(x) \frac{U}{Z_1},$$

where $\omega$ and $U$ are the frequency and amplitude of the supply voltage, $Z_1$ is the impedance of the primary winding, and $M(x)$ is the mutual inductance of the primary and secondary windings, dependent on the position x of the movable member. The value $M(x)$ depends on the inductance of the windings, i.e., on the number of turns, the material and configuration of the magnetic system constituted by the cores and the movable member. The value Z depends on the inductance and active resistance, which is much more dependent on the ambient conditions (first of all, on the temperature) than the inductance is. Therefore, the values $M(x)$ and Z vary to a different extent under the influence of external factors, and this leads to errors in the results of measurements.

Furthermore, in the embodiment of the device with the coaxial arrangement of the windings an additional error may originate because of the conditions being not the same along the transverse section, compared with the embodiment with the longitudinal arrangement of the windings, wherein a temperature gradient along the length may take place.

The technical solutions presented hereinbelow belong to a different group of transducers, namely, to inductive transducers.

For instance, an inductive linear displacement transducer is known (U.S. Pat. No. 4,954,776), comprising a winding arranged on a ferromagnetic core, a source of a-c voltage with a prescribed frequency, a movable member, and a thermosensitive measuring winding connected with the winding.

In the US Patent cited above the temperature effect is compensated for with respect to the resistance of the measuring winding, whereas measurements are effected in terms of the output voltage active component proportional to losses in the movable member, caused by eddy currents. Temperature variations lead to changes of the electromagnetic parameters (magnetic permeability, electrical conductivity) of the core and, hence, to changes in the value of losses which remains not compensated for.

Those components of the device which take part in the process of thermocompensation are under different conditions, and this leads to inadequate error compensation. The electrical compensation circuit is rather complicated.

Devices sufficiently close to the proposed invention are those for measuring linear displacements, based on the classical inductive divider circuit. However, there arises a problem characteristic of this type of transducers. The additional winding, which partially compensates for the additional error, must be found under the same physical conditions as the measuring winding, i.e., it must be disposed near the measuring winding all over the length thereof. But then, with the adopted manner of winding the turns, the additional winding will experience the influence of eddy currents of the movable member, and this will make the interpretation of the output signal ambiguous. In other words, it will be impossible to reveal the cause of variation of the additional winding impedance—whether it stems from the position of the movable member or from a change in the ambient conditions, this being equivalent to the appearance of a measurement error.

An inductive position transmitter is known (U.S. Pat. No. 5,331,277), belonging to the category of inductive dividers, which comprises an inductance coil with a constant and variable resistance that are interconnected and inserted between an a-c voltage source and ground, making-up a divider which shapes an output signal that varies in accordance with a prescribed relation.

The output voltage in the known device is determined from the formula $$U_{out} = \frac{VZ_1}{Z_1 + Z_2},$$

where V is the power supply voltage, $Z_1$ and $Z_2$ are the impedances of the windings with the variable and constant inductance, respectively. These windings differ in extension, because the first is distributed along the length and the second is concentrated within a small area. This causes dissimilar variation of their impedances under the effect of varying ambient conditions and leads to errors in the output signal value. The winding with the variable inductance consists of several sections, and the number of turns is chosen in accordance with a definite law. Said sections are distributed according to length, and the active-to-reactive resistance ratio in them is different. As a result, the impedances of the sections vary to a different extent, and this leads to violation of the prescribed law of the winding inductance variation, and, hence, to an error.

The prior art nearest to the proposed invention is a device for measuring linear displacements of induction type (D. I. Ageikin et al., "Control and Regulation Transducers", Mashinostroenie, Moscow, 1965, p. 126 (in Russian), comprising a primary detector and a measuring amplifier, the primary detector comprising a central cylindrical core and an external cylindrical core arranged coaxially, a movable member mounted coaxially thereto, and electrically interconnected measuring and additional windings, of which the first is disposed along the length of the central core so that its turns encompass the central core in a transverse direction, and the measuring amplifier is electrically connected with the measuring and additional windings.

In the known device the movable member is made as a metallic tube from a nonmagnetic material, which embraces the central core, the measuring winding is arranged on a frame in a gap between the central core and the external core, and the additional winding in the form of a throttle together with the measuring winding are inserted into a bridge circuit fed with an audio-frequency a-c voltage. The bridge circuit outputs are coupled to inputs of a tensometric amplifier. The device is intended mainly for measuring large linear displacements (up to 100 m).

The operation of the device is based on changes in the total resistance of the measuring winding as the electrically conducting movable member approaches it under the demagnetizing effect of eddy currents induced in the measuring winding.

The design of the device is such that the measuring winding and the additional winding are under different physical conditions. An appreciable additional error caused by the influence of external factors. With the measuring and additional windings inserted into a bridge circuit, constant voltage across the measuring winding cannot be ensured, and this leads to the appearance of an additional error in the output signal, namely, of the multiplicative error component which is understood as an error due to a change in the sensitivity of the primary detector. Variations in the ambient conditions bring about changes in the resistance of the measuring winding. This causes the appearance of an additive component which is understood as an error due to a change in the initial value of the output signal, corresponding to the initial position of the movable member.

The design of the primary detector in the known device limits its functional potentialities, complicating adaptation to the service conditions (for instance, mating of the movable member with the object of measurement). The arrangement of the measuring winding on a frame between the cores does not allow one to reduce the cross-sectional area of the primary detector.

BRIEF DESCRIPTION OF THE INVENTION

The main object of the present invention is to enhance the accuracy of measurements by compensating for the additional error caused by external factors.

Another object of the invention is to broaden the functional potentialities of the device by adaptation to the service conditions.

Said object is accomplished due to the fact that the device for measuring linear displacements comprises a primary detector and a measuring amplifier, the primary detector comprising a central cylindrical core and an external cylindrical core arranged coaxially to the longitudinal axis, and a movable member installed coaxially to said cores, said member being adapted to be connected with an object of measurement, a measuring winding having a first output and a second output and being arranged on the central core along the longitudinal axis in such a manner that its turns encompass the central core in a transverse direction, and an additional winding having a first output and a second output, being coupled with its first output to the first output of the measuring winding and arranged on one of the cores in such a manner that its turns encompass the core in a longitudinal direction and pass through a corresponding central axial opening, the measuring amplifier having two inputs for the supply of an a-c voltage, a group of inputs for coupling the first and second outputs of the measuring and additional windings, and an output at which a signal is shaped, carrying information on the linear displacement of the object of measurement.

The operating principle of the primary detector is based on the demagnetizing effect of eddy currents induced by the electromagnetic field of the measuring winding in the conducting movable member. As a result, the impedance of the measuring winding, or, to be more precise, of the part of the measuring winding, encompassed by the movable member, decreases appreciably. The length of this part varies as the movable member travels, causing a proportional variation of the impedance of the measuring winding and, consequently, of the output signal. At the same time, the resistance of the additional winding does not depend on the position of the movable member, because the turns of the additional winding are parallel to the axis of the movable member, and the field of the additional winding is, accordingly, perpendicular. Thereby, eddy currents are not induced in the movable member, and the additional winding designed in accordance with the proposed invention makes it possible, with the movable member in any position, to compensate for the error caused by external factors.

It is expedient that the measuring amplifier should comprise three operational amplifiers, the outputs of the first and second of such amplifiers being coupled to an inverting input of the third operational amplifier, whose output is the output of the measuring amplifier and whose inputs are the non-inverting inputs of the first and second operational amplifiers, to which a-c voltage is fed in antiphase.

The measuring amplifier built around three operational amplifiers makes it possible to use a sufficiently simple electric circuit and attain a high measurement accuracy.

It is expedient that the first outputs of the measuring and additional windings, which make up a common point, should be coupled to the inverting input of the first operational amplifier, the second output of the measuring winding should be coupled to the output of the first operational amplifier, and the second output of the additional winding should be coupled to the inverting input of the second operational amplifier.

In this case the first and second operational amplifiers together with the measuring and additional windings make up a "voltage-to-current" converter, as a result of which the measuring winding is powered from a source of current, whose advantages are obvious to those skilled in the art.

It is reasonable that the additional winding should consist of two sections having a common electrical connection point and that said additional winding should be coupled so that the output of the first section of the additional winding and the first output of the measuring winding, making up a common point, be coupled to the inverting input of the first operational amplifier, both sections of the additional winding be connected by their common point to the inverting input of the second operational amplifier, the output of the second section of the additional winding being connected to the output of the second operational amplifier, and the second output of the measuring winding being connected to the output of the first operational amplifier.

The connection of the first section of the additional winding to the measuring amplifier and to the measuring winding provides excitation (powering) of the measuring winding actually from the current source. The first section behaves in this case as a current-setting member, ensuring constancy of the voltage across the measuring winding. With the presence of a communication line between the primary detector and the measuring amplifier the described current supply circuit makes it possible to obviate the effect of the communication line parameters on the metrological characteristics of the device (the advantages of such current supply circuit are well known to those skilled in the art). Thus, the first section of the additional winding and its coupling compensate for the multiplicative component of the error caused by external factors.

The second section of the additional winding and its connection with the measuring winding and with the measuring amplifier provide compensation of the initial resistance of the measuring winding and, consequently, of the error stemming from its changes caused by variation of external factors, i.e., of the additive component of the additional error.

Division of the additional winding into two sections thus enables a more differentiated determination of the character of the additional error.

It is structurally expedient that the sections of the additional winding should be disposed on a central core made from a ferromagnetic material with a low electrical conductivity, the movable member be made as a tube from a material with a high electrical conductivity, and the external core be made from a nonmagnetic material with an electrical conductivity appreciably smaller than that of the movable member.

In one of embodiments with central disposition of the additional winding, the movable member encompasses the external core; in another embodiment the movable member is disposed between the external core and the central core.

Such an arrangement of the sections of the additional winding provides the most compact design of the primary detector. In this case the sections are mounted on the central core without frames, and the diameter of the central core can be minimized by reducing the diameters of the external core and the movable member, respectively.

In order to adapt the device to the service conditions, it is useful to arrange the sections on the external core made from a ferromagnetic material with a low electrical conductivity, and to make the movable member in the form of a tube or rod disposed inside the central core.

The central core can be made from a ferromagnetic material with a low electrical conductivity or from a nonmagnetic material with a low electrical conductivity, and the movable member can be made from as material with a high electrical conductivity or from a ferromagnetic material, respectively.

One more embodiment of the primary detector is structurally expedient, when the sections of the additional winding are disposed on the external core which is made from a ferromagnetic material with a low electrical conductivity, the movable member is made in the form of a tube from a ferromagnetic material and disposed between the external core and the central corer, the latter being made from a nonmagnetic material with a low electrical conductivity.

In all the above-stated structural embodiments, the materials from which the members of the primary detector are made are chosen so that an efficient interaction of the movable member and the winding should be attained, the level of the output signal being thereby increased.

It is useful that the number of turns in and the section of the wires of the sections of the additional winding should be such that the Q-factor of the sections of the additional winding be equal to the Q-factor of the measuring winding in the initial state.

To compensate for the temperature error, it is expedient that the measuring amplifier should additionally comprise an integrating operational amplifier, whose inverting input is coupled to the output with the output of the second operational amplifier. In another embodiment said integrating operational amplifier is coupled with its inverting input to the output of the first operational amplifier. Such coupling circuits should be chosen in accordance with the particular embodiment of the primary detector.

The above and other objects, features and advantages of this invention will be apparent from the following detailed description of illustrative embodiments which is to be read in connection with the accompanying drawings.

DETAILED DESCRIPTION OF THE INVENTION

Figure 1:
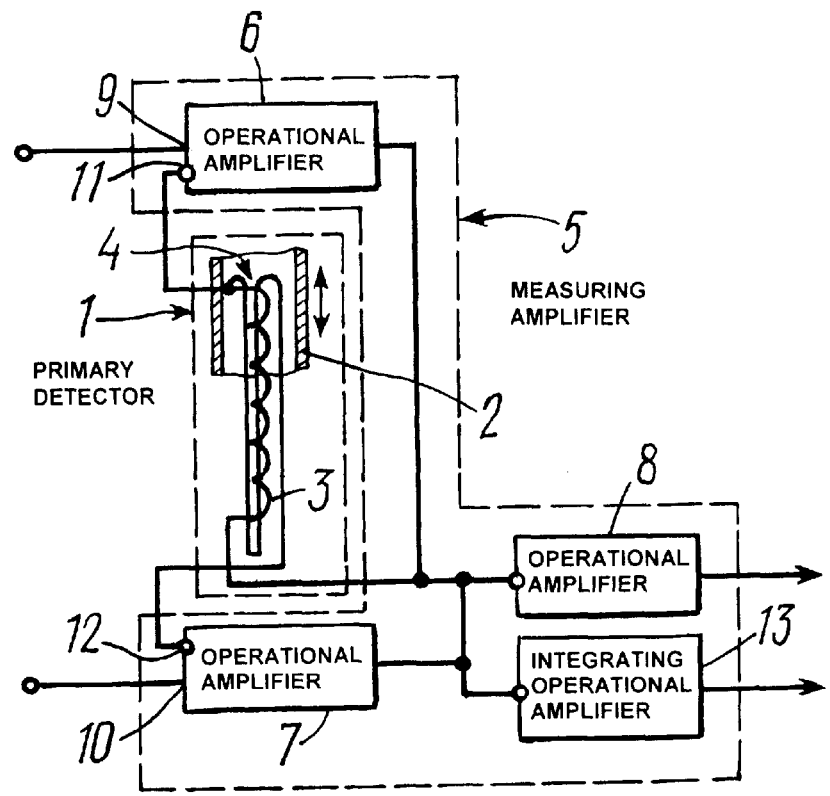
FIG. 1 shows a block diagram of the device for measuring linear displacements, according to the invention.

A device for measuring linear displacements comprises a primary detector 1 (FIG. 1) comprising a magnetic circuit in the form of a central core and an external core arranged coaxially (not shown in the Drawing, with a movable member 2 arranged coaxially to said cores, adapted for connection with an object of measurement. Primary detector 1 comprises also a measuring winding 3 disposed on the central core along the length thereof in such a manner that its turns encompass the central core in a transverse direction, and an additional winding 4 having a common electrical connection point with the measuring winding 3. The additional winding 4 is arranged on one of the cores so that the turns of the additional winding encompass the core in a longitudinal direction and pass through a corresponding central axial opening, this constituting a fundamental difference in the manner the measuring winding 3 and the additional winding 4 are wound. The disposition of the windings 3, 4 is shown conventionally in FIG. 1 and in more detail in the drawings that follow. The movable member 2 is shown conventionally encompassing the windings 3, 4; it is of importance that the axis of the movable member 2 is parallel to the turns of the additional winding 4 and 8 parallel to the turns of the measuring winding 3.

With such an arrangement, the measuring winding 3 and the additional winding 4 have almost the same length and are found under the same physical conditions; due to this fact it becomes possible to reduce appreciably the additional error caused by external factors, such as temperature, humidity, and the like.

The device comprises a measuring amplifier 5 provided with inputs for coupling to a source of a-c voltage (not shown) and with inputs for electrical connection with the outputs of the measuring winding 3 and additional winding 4. At the output of the measuring amplifier a signal is shaped which carries information on the displacement of the object of measurement.

In the embodiment of the invention being described, the measuring amplifier comprises three operational amplifiers 6, 7 and 8. The outputs of the first two of said operational amplifiers are coupled to the inverting input of the third operational amplifier 8, whose output is the measuring amplifier 5. To non-inverting inputs 9, 10 of the operational amplifiers 6, 7, which are inputs of the measuring amplifier 5, a-c voltage from a corresponding source of voltage is fed in antiphase. The measuring winding 3 is coupled to the first operational amplifier 6 as a negative coupling feedback resistor in such a manner that the outputs of the measuring winding 3 are connected with inverting input 11 and with the output of said operational amplifier 6. The additional winding 4 is coupled with its first output, like the measuring winding 3, to the inverting input of the operational amplifier 6, and with its second output said winding 4 is connected with the inverting input of the operational amplifier 7.

In the embodiment of the invention being described the measuring amplifier may comprise an integrating operational amplifier 13 (for the sake of simplicity further referred to as integrator 13), whose inverting input is coupled to the output of the operational amplifier 7. The output signal of the integrator 13 is used to compensate for the temperature error, and the a-c voltage fed to the operational amplifiers 6, 7 contains a constant component.

Figure 2:
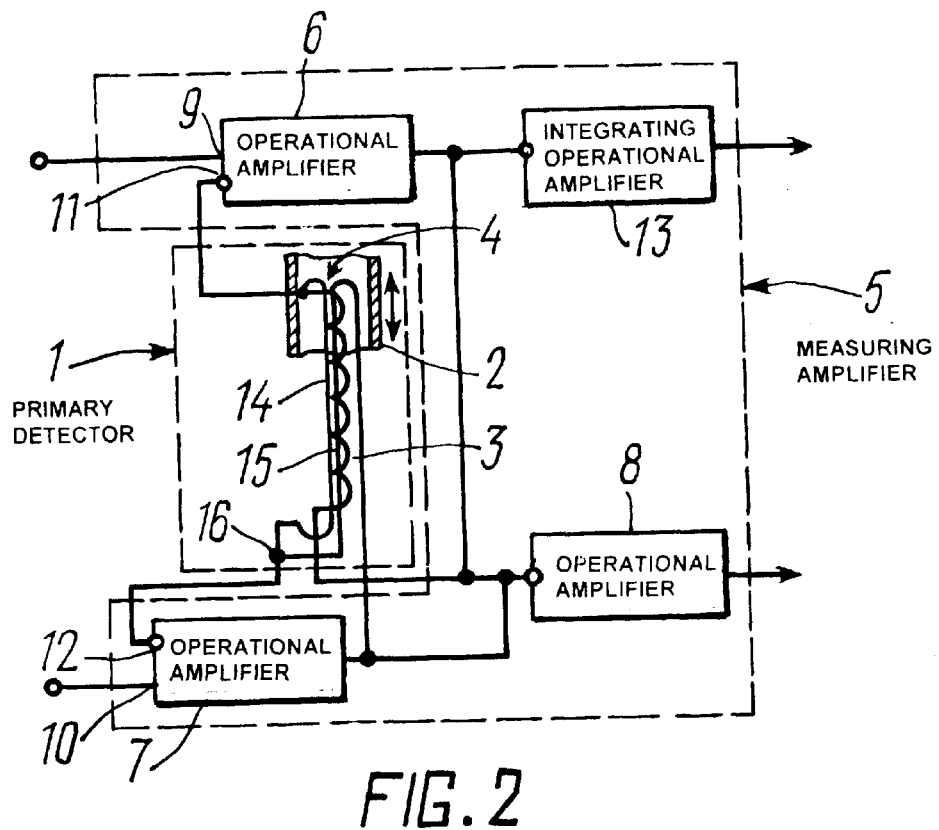
FIG. 2 shows the same as FIG. 1, with the additional winding consisting of two sections, according to the invention.

In another embodiment of the invention, shown in FIG. 2, the additional winding 4 is made of two sections 14, 15 having a common electrical connection point 16. The block diagram of the measuring amplifier is the same as in the embodiment shown in FIG. 1, the difference being in the coupling of the additional winding 4: output of the first section 14 is coupled to the inverting input 11 of the operational amplifier 8, the common point 16 is coupled to inverting input 12 of the operating amplifier 7, and the output of the second section 15 is coupled to the output of the operational amplifier 7.

Like in the above-described embodiment of the invention, the measuring amplifier may comprise an integrator 13 which performs a similar function but which is coupled in a different manner, namely, to the output of the operational amplifier 6.

FIGS. 3–6 of the accompanying Drawings show several versions of the embodiment and arrangement of the members comprised in the primary detector 1. All said Figures show a magnetic circuit consisting of a central core 17 and an external core 18, movable member 2, measuring winding 3 and additional winding 4, the additional winding 4 being made of two sections 14, 15. In the first group of embodiments, shown in FIGS. 3, 4, the additional winding 4 is disposed on the central core 17; in the second group, shown in FIGS. 5, 6, it is disposed on the external core 18. Similar embodiments can be successfully used for the non-sectional design of the additional winding 4.

Figure 3:
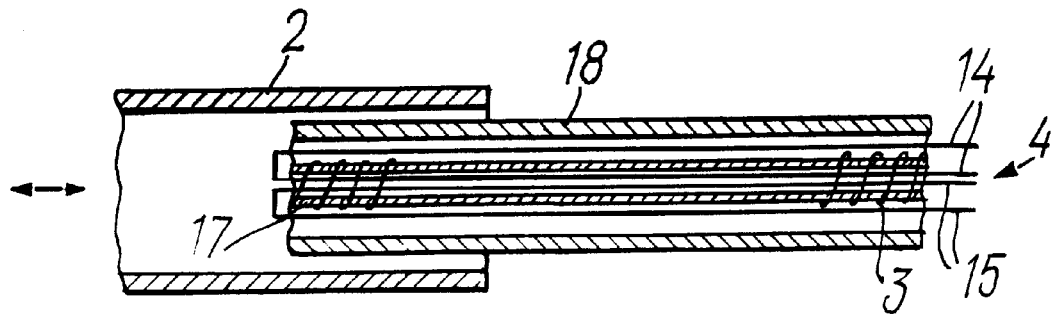
FIG. 3 shows an embodiment of the device with the additional winding arranged on the central core and the movable member encompassing the external core, according to the invention.

For instance, FIG. 3 shows an embodiment in which the additional winding 4 is disposed on the central core 17 made from a ferromagnetic material with a low electrical conductivity, the movable member 2 is made in the form of a tube from a material with a high electrical conductivity and encompasses the external core 18 which is made from a nonmagnetic material whose electrical conductivity is appreciably smaller than that of the movable member 2.

An example of a particular embodiment of the primary detector according to FIG. 3 is presented hereinbelow.

The central core having a diameter of 8 mm is made from carbonaceous steel; the external core having a diameter of 12 mm is made from stainless steel; the length of the cores is 245 mm with the measuring range of 200 mm. The movable member having a diameter of 18 mm is made of duraluminum. The measuring winding is made of copper wire having a diameter of 0.2 mm and wound on the central core; the additional winding is wound without a frame over the measuring frame, using a 0.8 mm-diameter wire. Each section of the additional winding has 16 turns. The power supply voltage is 5 V, 5 kHz. The temperature error in the temperature range of −40° C. to +80° C. does not exceed 0.15%/10° C.

Figure 4:
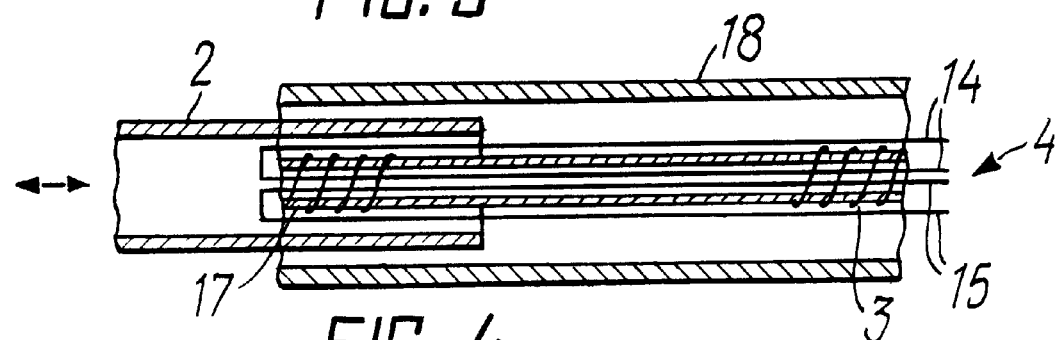
FIG. 4 shows the same as FIG. 3, with the movable member encompassing the central core, according to the invention.

The design of the primary detector 1 shown in FIG. 4 is essentially the same, the difference being in that the movable member 2 is disposed between the external core 17 and the central core 18.

In such embodiments the cross-sectional area of the detector 1 can be reduced most effectively, because both windings 3 and 4 are arranged without frames on the central core 17 whose diameter can be minimized by reducing the dimensions of the external core 18 and of the movable member 2, respectively. The movable member can slide either without a clearance over the external core 18, functioning as a housing, or inside said core 18, functioning as a guide.

The embodiments of the primary detector 1, described above, allow hermetic encapsulation of the windings 3, 4 together with the central core 17, so that the device can be used in aggressive media, at high pressures, and under other conditions.

Figure 5:
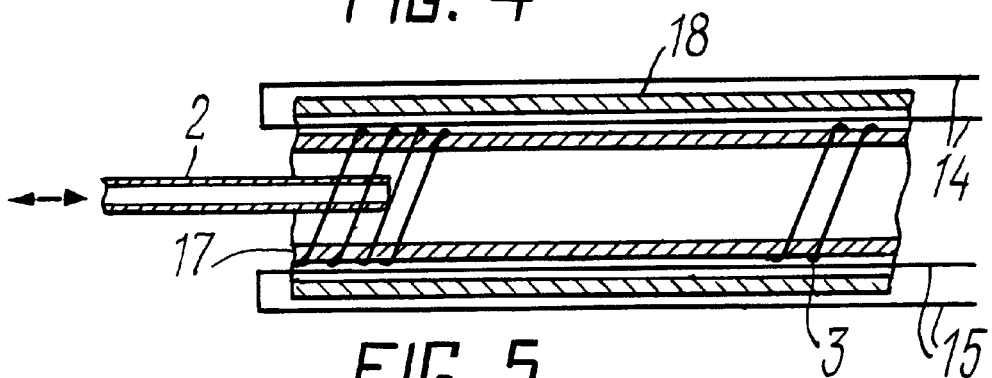
FIG. 5 shows an embodiment of the device with the additional winding arranged on the external core and the movable member disposed inside the central core, according to the invention.

FIG. 5 shows an embodiment in which the additional winding 4 is arranged on the external core 18 which is made of a ferromagnetic material with a low electrical conductivity, the movable member 2 is made as a tube or rod from a material having a high electrical conductivity, and is disposed inside the central core 17 made from a ferromagnetic material with a low electrical conductivity.

The design of the primary detector 1 shown in FIG. 5 is essentially in the same as in the preceding embodiment. The difference is that the central core 17 is made from a nonmagnetic material with a low electrical conductivity and the movable member 2 is made from a ferromagnetic material.

Figure 6:
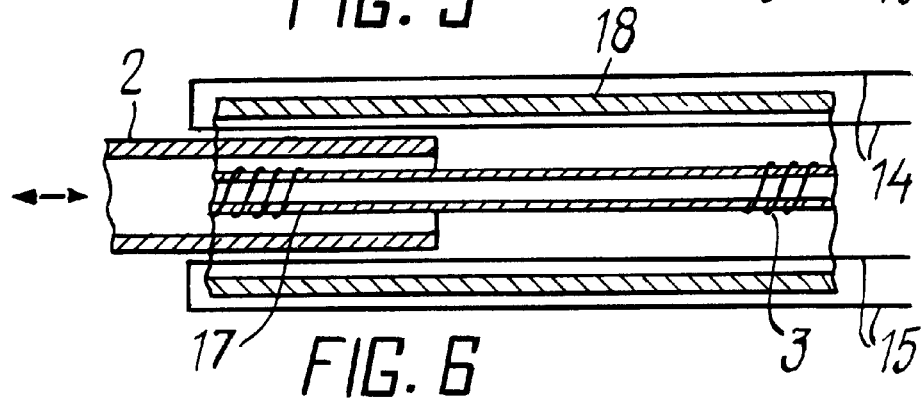
FIG. 6 shows the same as FIG. 5, with the movable member disposed between the cores, according to the invention.

FIG. 6 shows one more embodiment of the primary detector 1, in which the additional winding 4 is disposed on the external core 18 made from a ferromagnetic material with a low electrical conductivity, the movable member 2 is made as a tube from a ferromagnetic material and disposed between the external core 18 and the central core 17, the latter being made from a nonmagnetic material with a low electrical conductivity.

For all the embodiments of the primary detector 1 the following concepts are used: "high electrical conductivity" is the electrical conductivity on the order of $$2 - 3 \cdot 10^{-5} \frac{1}{\Omega m},$$

characteristic of, e.g., aluminum alloys; "low electrical conductivity" is the electrical conductivity one order of magnitude smaller (down to an insulator), e.g., stainless steel with the electrical conductivity on the order of $$10^{-6} \frac{1}{\Omega m};$$

"ferromagnetic material" is a material with a relative magnetic permeability of 1000 and higher. Such relations are necessary for an effective interaction of the movable member 2 with the windings 3, 4 to provide a high level of the output signal.

The described structural embodiments of the primary detector broaden appreciably the functional potentialities of the device, enabling one to choose the movable member in accordance with the service conditions and with the character of the object of measurement, as well as when it is necessary to minimize the cross-sectional area of the primary detector. In some cases the object of measurements can be used as the movable member, provided that the requirements to the used materials are met.

The device of the invention for measuring linear displacements operates in the following manner.

The operating principle of the primary detector 1 is common to all its embodiments and based on the demagnetizing effect of eddy currents induced by the electromagnetic field of the measuring winding 3 in the conducting movable member 2 (the versions of its arrangement are of no importance, unless the process is circumstantiated). As a result, the impedance of the measuring winding 3, or, to be more precise, of the part thereof encompassed by the movable member 2, decreases appreciably. The length of this part changes as the movable member 2 moves, causing a proportional change in the impedance of the measuring winding 3 and, consequently, a change of the output signal.

At the same time, the resistance of the additional winding 4 does not depend on the position of the movable member 2, because the turns of said winding 4 are parallel, and the field of said winding is perpendicular to the axis of the movable member 2, respectively, and therefore eddy currents are not induced in the movable member 2. The compensating action of the additional winding 4 is thus preserved in any position of the movable member 2.

In the embodiments with the movable member 2 made of a ferromagnetic material the primary detector 1 functions essentially in the manner described above. The difference is in that the presence of the ferromagnetic material intensifies the field of the measuring winding 3 by increasing the impedance of its portion encompassed by the movable member 2 (the situation will be the same with the movable member 2 disposed inside the winding 3). In this case the resistance of the additional winding 3 is almost independent of the position of the movable member 2, because the lines of force of the field thereof close mainly round the periphery of the core 17 or 18 on which said winding 3 is disposed.

Let us consider first the operation of the device shown in FIG. 1, but without the integrator 13. When an a-c voltage with a stabilizing amplitude U is fed to the non-inverting inputs 9, 10 of the operational amplifiers 6, 7, at the outputs of said first and second operational amplifiers there originate respective voltages $$U_1 = \left(1 + \frac{Z_u}{Z_1}\right)U, \tag{1}$$

$$U_2 = \left(1 + \frac{R_{fb}}{Z_1}\right)U, \tag{2}$$

where $Z_u$ is the complex resistance of the measuring winding 3, $Z_1$ is the resistance of the additional winding 4, $R_{fb}$ is the resistance of the feedback circuit of the operational amplifier 7.

Since the signals at the inputs 9, 10 of the operational amplifiers 6, 7 are in antiphase, the voltage $U_{out}$ at the output of the operational amplifier 8—at the output of the measuring amplifier 5 can be represented as $$U_{out} = k_1 U_1 - k_2 U_2, \tag{3}$$

where $k_1$ and $k_2$ are the gains with respect to the input of the operational amplifier 8, connected with the operational amplifiers 6 and 7, respectively. Assuming that $k_1=1$, we obtain from (3) in view of (1) and (2):

$$U_{out} = U_1 - k_2 U_2 = \left(k_1 - k_2 + \frac{k_1 Z_u - k_2 R_{fb}}{Z_1}\right)V \tag{4}$$

The complex resistance $Z_u$ of the measuring winding 3 can be represented as $Z_u = Z_0 + \Delta Z$, where $Z_0$ is the initial impedance of the winding 3 with the movable member 2 in one of its extreme positions (for instance, when it is completely withdrawn from the primary detector 1), $\Delta Z$ is the resistance of the measuring winding 3, caused by the change in the position of the movable member 2.

If we characterize the position (displacement) of the movable member 2 by a coordinate x read off along its axis from a fixed point (e.g., from the edge of the core), then the change in the resistance of the measuring winding 3 is a function of x, close to the linear one:

$$Z(x) = cx, \tag{5}$$

where c is the proportionality factor, determined mainly by the initial impedance of the measuring winding 3 encompassed by the movable member 2, and $Z(0)=0$. In this case expression (4) takes the form:

$$U_{out}(x) = \left(k_1 - k_2 + \frac{k_1 Z_u - k_2 R_{fb}}{Z_1}\right)V = Sx + V_0 \tag{6}$$

The value of the gains $k_1$ and $k_2$ are chosen so that $k_1 R_0 \gg k_2 R_{fb}$, that is, $k_1 R_0 - k_2 R_{fb} \approx k_1 R_0$, where $R_0$ is the active resistance of the measuring winding 3 in the initial state. The number of turns and the diameter of the wire of the additional winding 4 are chosen so that its Q-factor should be equal to the Q-factor of the measuring winding 3 in the initial state:

$$Q = \frac{X_0}{R_0} = \frac{X_1}{R_1}, \quad (7)$$

where $R_0$, $X_0$ and $R_1$, $X_1$ are the active and reactive resistances of the measuring winding 3 and the additional winding 4, respectively.

The expression for the initial output voltage U in this case is:

$$U_0 = \left(k_1 - k_2 + \frac{k_1 Z_0 - k_2 R_{fb}}{Z_1}\right)V \approx \left(k_1 - k_2 + k_1 \frac{Z_0}{Z_1}\right)V = \quad (8)$$

$$\left(k_1 - k_2 + k_1 \frac{R_0}{R_1}\right)V.$$

As is known, temperature is the main factor influencing the value of the additional error. The dependence of the active resistance on the temperature t has the form:

$$R(t) = R(t_0)(1 + \alpha t) \quad (9)$$

where $\alpha$ is the temperature coefficient of the electrical resistance of the wire, $R_0(t)$ is the resistance at the rated temperature (usually at t=20° C.). Assuming that the temperature of both windings 3, 4 is the same (this condition obviously holding true, if they are disposed on one core 17) and substituting (9) into (8), we shall obtain:

$$V_0 = \left(1 - k_2 + \frac{R_0(t_0)}{R_1(t_1)}\right)V. \quad (10)$$

In equation (10) $R_0(t_0)$ and $R_1(t_1)$ a fixed values known beforehand, so that the voltage $U_0$ does not depend on the parameters of the primary detector 1, subject to the influence of external factors. Therefore, if condition (7) is observed, the value $U_0$ is stable, that is, additive error component is absent in the output signal.

In the expression for the sensitivity $$S = \frac{cV}{Z_1}$$

the values c and $Z_1$ are of the same nature and change under the influence of external factors in a similar manner. This contributes to the stability of the value S, compensating to a considerable extent for the multiplicative component.

Therefore, the proposed embodiment of the additional winding 4 and its coupling provide an increase in the accuracy of the output signal by reducing an additional error therein.

The device in which the additional winding 4 consists of two sections 14, 15 (FIG. 2) operates basically in the same manner as described above. In equations (1), (2), (4) for the voltages $U_1$, $U_2$ and $U_{out}$, respectively, at the outputs of the operational amplifiers 6, 7, and 8 resistances $Z_1$, $Z_2$ of sections 14,15 of the additional winding 4 will be found. For the sake of convenience we shall assume that the designations adopted for the additional winding 4 in FIG. 1 apply in the present embodiment to the first section 14 of the additional winding 4:

$$U_1 = \left(1 + \frac{Z_u}{Z_1}\right)U, \quad (1')$$

$$U_2 = \left(1 + \frac{Z_2}{Z_1}\right)U, \quad (2')$$

$$U_{out} = \quad (4')$$
$$U_1 - k_2 U_2 = \left[1 + \frac{Z_u}{Z_1} - k_2\left(1 + \frac{Z_2}{Z_1}\right)\right]U = \left[1 - k_2 + \frac{Z_u - k_2 Z_2}{Z_1}\right]U.$$

Since the number of turns and the wire cross-section in the additional winding 4 are chosen so that its sections 14, 15 have the same Q-factor as the measuring winding 3 in the initial state, $$\frac{X_0}{R_0} = \frac{X_2}{R_2} = Q, \quad (11)$$

or $$\frac{R_0}{R_2} = \frac{X_0}{X_2} = q,$$

where $R_0$, $X_0$, and $R_2$, $X_2$ are the active and reactive resistances of the measuring winding 3 and of the second section 15 of the additional winding 4, respectively.

Having chosen $k_2=q$, we have from (11):

$$R_0 = k_2 R_2, X_0 = k_2 X_2, Z_0 = k_2 Z_2. \quad (12)$$

On the strength of (12), the output voltage $$U_{out} = \left(1 - k_2 + \frac{\Delta Z}{Z_1}\right)U, \quad (13)$$

i.e., it does not depend on the initial resistance of the measuring winding 3, this being equivalent to compensating for the additive component of the measuring error.

Since the measuring winding 3 and the additional winding 4 are under the same physical conditions whose variations tell in an equal extent on the resistances of said windings, relations (12) and (13) will hold true on changes of the ambient conditions (e.g., on temperature variations) as well.

The $$\frac{\Delta Z}{Z_1}$$

ratio in (13), caused by the cross-field coupling of the measuring winding and the first section 14 of the additional winding 4, makes it possible to compensate to a considerable extent for the multiplicative component of the additional measuring error as well.

The above-stated conditions (7) and (11) which relate to the Q-factor of the windings 3, 4, can be realized in the following manner. It is known that the inductance of the winding can be calculated from the formula $L=W^2G$, where W is the number of turns, G is the magnetic conductance for the magnetic flux created by the current of the winding, said magnetic conductance depending on the material, dimensions and shape of the magnetic circuit on which the winding is disposed. The active resistance of the winding R=Wr, where the resistance r of one turn is determined (at a prescribed frequency $\omega$ of the power supply voltage) by the diameter (area or periphery) of the wire. Then the Q-factor of the winding is:

$$Q = \frac{X}{R} = \frac{\omega L}{R} = \frac{\omega W^2 G}{Wr} = \frac{\omega WG}{r}. \quad (14)$$

Assuming the power supply frequency and the magnetic circuit to be chosen, the required value Q can be obtained by an appropriate choice of the number of turns and the wire diameter of the windings, securing thereby the fulfillment of conditions (7) and (11).

We shall now consider the operation of the device shown in FIG. 1, provided with integrator 13. As is known, power supply voltage, like any variable signal, can be represented as U=Uc+Uv, where Uv is the variable and Uc is the constant component of the signal. At the same time, Uc is the mean value of voltage U during its period. Assuming that the measuring amplifier 5 together with the windings 3, 4 makes up a linear electric circuit, we can consider the operation of the device, by virtue of the superposition principle, independently and separately only with the power supply Uc (direct current) and only with the power supply Uv (alternating current), and then add the results together. The operation of the device on alternating current is described above.

In the case of direct current (with Uc voltage at the input 10 of the second operational amplifier 7) we have:

$$U_{2c} = \left(1 + \frac{R_{fb}}{R_0}\right)Uc, \quad (15)$$

since in the case of direct current the inductive resistance of the windings 3, 4 is zero and $Z_u=R_0$, $Z_1=R_1$, i.e., the total resistance is equal to the active resistances. The total voltage at the output of the second operational amplifier 7, and, hence, at the input of the integrator 13, is determined from the relation:

$$U_2=U_{2c}+U_{2v}. \quad (16)$$

Since the integrator 13 filters the variable component $U_{2v}$, its output voltage with the gain $k_4$ will be:

$$U_4 = -k_4 U_{2c} = \left(1 + \frac{R_{fb}}{R_1}\right)Uc \quad (17)$$

or, by virtue of (9), it has the form:

$$U_4 = -k_4\left(1 + \frac{R_{fb}}{R_1(t_0)(1+\alpha t)}\right)Uc, \quad (18)$$

whence the temperature is determined:

$$t = -\frac{1}{\alpha}\left[\frac{R_{fb}}{R_1(t_0)\left(\frac{U_4}{R_4 Vc} - 1\right)}\right], \quad (19)$$

where all the values in the right-hand side are known. Consequently, from the value of the output voltage of the integrating amplifier 13 it is possible to determine the temperature of the additional winding 4 and, hence, the temperature of the measuring winding 3, if they are disposed on one core 17 or if the temperature gradient over the section of the primary detector 1 is absent. The obtained information then can be used for almost complete compensation for the temperature error. This operation can be automated, for instance, with the help of a programmable microprocessor, into whose memory the temperature characteristic of the primary detector is entered.

For those embodiments of the device, in which the additional winding 4 is disposed on the external core 18 (FIGS. 5, 6), the compensation for the temperature error may be not quite adequate because of the temperatures of the temperatures of the windings 3, 4 being not quite the same due to possible temperature gradient over the cross-section of the primary detector 1. Tests in a controlled-temperature cabinet demonstrate that after the primary detector 1 is heated (cooled) for 60° C. the temperature levels out over its cross-section in 30–40 minutes, depending on the design and size of the primary detector 1.

The information on the temperature of the windings 3, 4 being known, the negative effect of the temperature gradient can be neutralized by using integrator 13 in the circuit of the device.

The output voltage of the integrator 13 coupled to the output of the first operational amplifier 6 with d-c input voltage U is determined from the formula:

$$U_4 = -k_4 U_{1c} = k_4\left(1 + \frac{R_0}{R_1}\right)Uc. \quad (20)$$

Suppose that the temperature of the first section 14 of the winding 4 is t, and the temperature of the measuring winding 3 is t+Δt. Then, on the strength of (9) from (20) we have:

$$U_4 = k_4 Uc\left[1 + \frac{R_0(t_0)(1+\alpha(t+\Delta t))}{R_1(t_0)(1+\alpha t)}\right] = V_{40} + k\frac{\Delta t}{R_1}, \quad (21)$$

where $k_4$ is the gain of the integrator 13. If the temperature of the windings 3, 4 is the same, i.e., Δt=0, then $U_4=U_{40}$, where $U_{40}$ is the fixed value known beforehand. If Δt≠0, i.e., the temperature of the measuring winding 3 is higher or lower than the temperature of the additional winding 4, then the value $U_4$ deviates from the equilibrium $U_{40}$ in the same direction. Therefore, the voltage from the output of the integrator 13 can be used for correcting the results of measurements with taking into account the temperature gradient over the cross-section of the primary detector 1. Further treatment of the signal can be carried out as described for the embodiment shown in FIG. 1.

Hence, the proposed invention provides an increase in the accuracy of measurements owing to a reduction of the additional error caused by external factors. The functional potentialities are broadened and the adaptation to service conditions is improved owing to different embodiments of the proposed device.

We claim:

1. A device for measuring linear displacements, which, on being coupled to an object of measurement and connected to a source of a-c voltage, shapes an output signal carrying information on the linear displacement of said object, said device comprising:
 a primary detector comprising:
  a central core shaped as a cylinder provided with a central axial opening, having a longitudinal axis;
  an external core shaped as a cylinder provided with a central axial opening, disposed coaxially to said central core;
  a movable member disposed coaxially with said external and central cores and connected with said object;
  a measuring winding consisting of turns, having a first output and a second output, disposed on said central core along said longitudinal axis so that said turns encompass said central core in a longitudinal direction and induce eddy currents in said movable member as said movable member moves;

an additional winding consisting of turns, having a first output and a second output, said first output with said additional winding connected to said first output of said measuring winding, said additional winding being disposed on one of said cores so that said turns of said additional winding encompass one of said cores in a longitudinal direction and pass through the corresponding said central axial opening, said additional winding compensating for an additional error caused by external factors with said movable member in any position;

said device further comprising a measuring amplifier having a first input and a second input, a-c voltage from said source being fed to each of said inputs, a third input of said measuring amplifier, connected to said first output of said measuring winding and said first output of said additional winding;

a fourth input of said measuring amplifier, connected to said second output of said measuring winding;

a fifth input of said measuring amplifier, connected to said second output of said additional winding;

an output of said measuring amplifier at which a signal is shaped, carrying information about the linear displacement of said object.

2. A device according to claim 1, wherein said measuring amplifier comprises:

a first operational amplifier having a non-inverting input that serves as said first input of said measuring amplifier, an inverting input, and an output, a second operational amplifier having a non-inverting input that serves as said second input of said measuring amplifier, an inverting input, and an output, the a-c voltage from said course being fed in antiphase to said non-inverting inputs of said first and said second operational amplifiers;

a third operational amplifier having an inverting input connected to said output of said first operational amplifier and to said output of said second operational amplifier, and an output that serves as said output of said measuring amplifier.

3. A device according to claim 1, wherein said first outputs of said measuring and additional windings are coupled to said inverting input of said first operational amplifier, said second output of said measuring winding is coupled to said output of said first operational amplifier, and said second output of said additional winding is coupled to said inverting input of said second operational amplifier.

4. A device according to claim 1, wherein said additional winding comprises a first section and a second section having a common electrical connection point, said first output of said additional winding being an output of said first section, and said second output being an output of said second section.

5. A device according to claim 4, whereas said output of said first section of said additional winding and said first output of said measuring winding are coupled to said inverting input of said first operational amplifier, both said sections of said additional winding are coupled by their said common electrical connection point with said inverting input of said second operational amplifier, said output of said second operational amplifier being connected with said output of said second section of said additional winding, said second output of said measuring winding being connected with said output of said first operational amplifier.

6. A device according to any of claim 1, wherein said additional winding is disposed on said central core made from a ferromagnetic material with a low electrical conductivity, said movable member is made in the form of a tube from a material with a high electrical conductivity, and said external core is made from a nonmagnetic material with an electrical conductivity appreciably lower than the electrical conductivity of said movable member.

7. A device according to claim 6, wherein said movable member encompasses said external core.

8. A device according to claim 6, wherein said movable member is disposed between said external core and said central core.

9. A device according to claim 1, wherein said additional winding is disposed on said external core made from a ferromagnetic material with a low electrical conductivity, said movable member is made in the form of a tube or rod and is disposed inside said central core.

10. A device according to claim 9, wherein said central core is made from a ferromagnetic material with a low electrical conductivity and said movable member is made from a material with a high electrical conductivity.

11. A device according to claim 9, wherein said central core is made from a nonmagnetic material with a low electrical conductivity and said movable member is made from a ferromagnetic material.

12. A device according to claim 1, wherein said additional winding is disposed on said external core made from a ferromagnetic material with a low electrical conductivity, said movable member is made in the form of a tube from a ferromagnetic material and is disposed between said external core and said central core, said central core being made from a nonmagnetic material with a low electrical conductivity.

13. A device according to claim 3, wherein said measuring amplifier additionally comprises an integrating operational amplifier having an inverting input connected with said output of said second operational amplifier and an output at which a signal is shaped to compensate for an additional error, the a-c voltage fed in antiphase to said non-inverting inputs of said first and second operational amplifiers containing a constant component.

14. A device according to claim 5, wherein said measuring amplifier additionally comprises an integrating operational amplifier having an inverting input connected with said output of said first operational amplifier and an output at which a signal is shaped to compensate for an additional error, the a-c voltage fed in antiphase to said non-inverting inputs of said first and second operational amplifiers containing a constant component.

15. A device according to claim 1, wherein said additional winding is of wire and has a Q-factor, said measuring winding also has a Q-factor; the number of said turns and the cross-section of each of said turns of said additional winding are such that the Q-factor of said additional winding is equal to the Q-factor of said measuring winding before the beginning of measuring the linear displacements of said object.

* * * * *